(12) United States Patent
Nossik et al.

(10) Patent No.: US 10,609,143 B1
(45) Date of Patent: Mar. 31, 2020

(54) SECURE DATA ACCESS IN CLOUD COMPUTING ENVIRONMENTS

(71) Applicant: EMC IP Holding Company LLC, Hopkinton, MA (US)

(72) Inventors: Misha Nossik, Ottawa (CA); Lejin Du, Kanata (CA)

(73) Assignee: EMC IP Holding Company LLC, Hopkinton, MA (US)

( * ) Notice: Subject to any disclaimer, the term of this patent is extended or adjusted under 35 U.S.C. 154(b) by 246 days.

(21) Appl. No.: 15/268,788

(22) Filed: Sep. 19, 2016

(51) Int. Cl.
*G06F 15/173* (2006.01)
*H04L 29/08* (2006.01)

(52) U.S. Cl.
CPC ...... *H04L 67/1097* (2013.01); *H04L 67/2866* (2013.01)

(58) Field of Classification Search
CPC .................. H04L 67/1097; H04L 67/2866
See application file for complete search history.

(56) References Cited

U.S. PATENT DOCUMENTS

| | | | | |
|---|---|---|---|---|
| 2013/0086585 | A1* | 4/2013 | Huang | H04L 67/14 718/1 |
| 2013/0262923 | A1* | 10/2013 | Benson | H04L 67/1097 714/15 |
| 2015/0347542 | A1* | 12/2015 | Sullivan | G06F 16/254 707/602 |
| 2015/0381435 | A1 | 12/2015 | Todd et al. | |
| 2016/0105488 | A1 | 4/2016 | Thakkar et al. | |
| 2016/0378518 | A1* | 12/2016 | Antony | G06F 9/45533 718/1 |
| 2017/0011054 | A1* | 1/2017 | Chennamsetty | G06F 16/172 |
| 2017/0171164 | A1* | 6/2017 | Alexander | H04L 63/0823 |
| 2018/0196731 | A1* | 7/2018 | Moorthi | G06F 11/3664 |

OTHER PUBLICATIONS

U.S. Appl. No. 14/820,026 filed in the name of Vaibhav Khanduja et al. filed Aug. 6, 2015 and entitled "Provisioning Isolated Storage Resource Portions for Respective Containers in Multi-Tenant Environments."

(Continued)

*Primary Examiner* — Mohamed A. Wasel
*Assistant Examiner* — Rachel J Hackenberg
(74) *Attorney, Agent, or Firm* — Ryan, Mason & Lewis, LLP

(57) ABSTRACT

An apparatus in one embodiment comprises cloud infrastructure having at least a first cloud. The apparatus further comprises a storage system separate from the first cloud and providing persistent storage for an application and associated data. The first cloud comprises a virtual machine image having installed therein an application launcher for the application of the storage system. Responsive to a request to execute the application, the first cloud configures a virtual machine instance based on the virtual machine image to execute the application launcher. In conjunction with the execution of the application launcher, the application is loaded from the storage system into the virtual machine instance for execution. In conjunction with the execution of the application, a data proxy associated with the application communicates with the storage system to transfer portions of the data required for execution of the application into non-persistent storage of the virtual machine instance.

20 Claims, 10 Drawing Sheets

(56) References Cited

OTHER PUBLICATIONS

U.S. Appl. No. 15/075,858 filed in the name of Mish Nossik et al. filed Mar. 21, 2016 and entitled "Security Layer for Containers in Multi-Tenant Environments."
Clearsky Data, "Welcome to the Global Storage Network Plug In," Data Sheet, 2016, 2 pages.
Velostrata Inc., "Velostrata Move Production Workloads to a Public Cloud in Minutes," Data Sheet, 2016, 2 pages.

* cited by examiner

SECURE DATA ACCESS IN CLOUD COMPUTING ENVIRONMENTS

FIELD

The field relates generally to information processing systems, and more particularly to information processing systems comprising cloud infrastructure.

BACKGROUND

Information processing systems increasingly utilize reconfigurable virtual resources to meet changing user needs in an efficient, flexible and cost-effective manner. For example, cloud computing environments implemented using various types of virtualization techniques are known. These illustratively include operating system level virtualization techniques such as Linux containers. Such containers may be used to provide at least a portion of the cloud infrastructure of a given information processing system. Other types of virtual machines such as those implemented using a hypervisor can additionally or alternatively be used.

DETAILED DESCRIPTION

Figure 1:
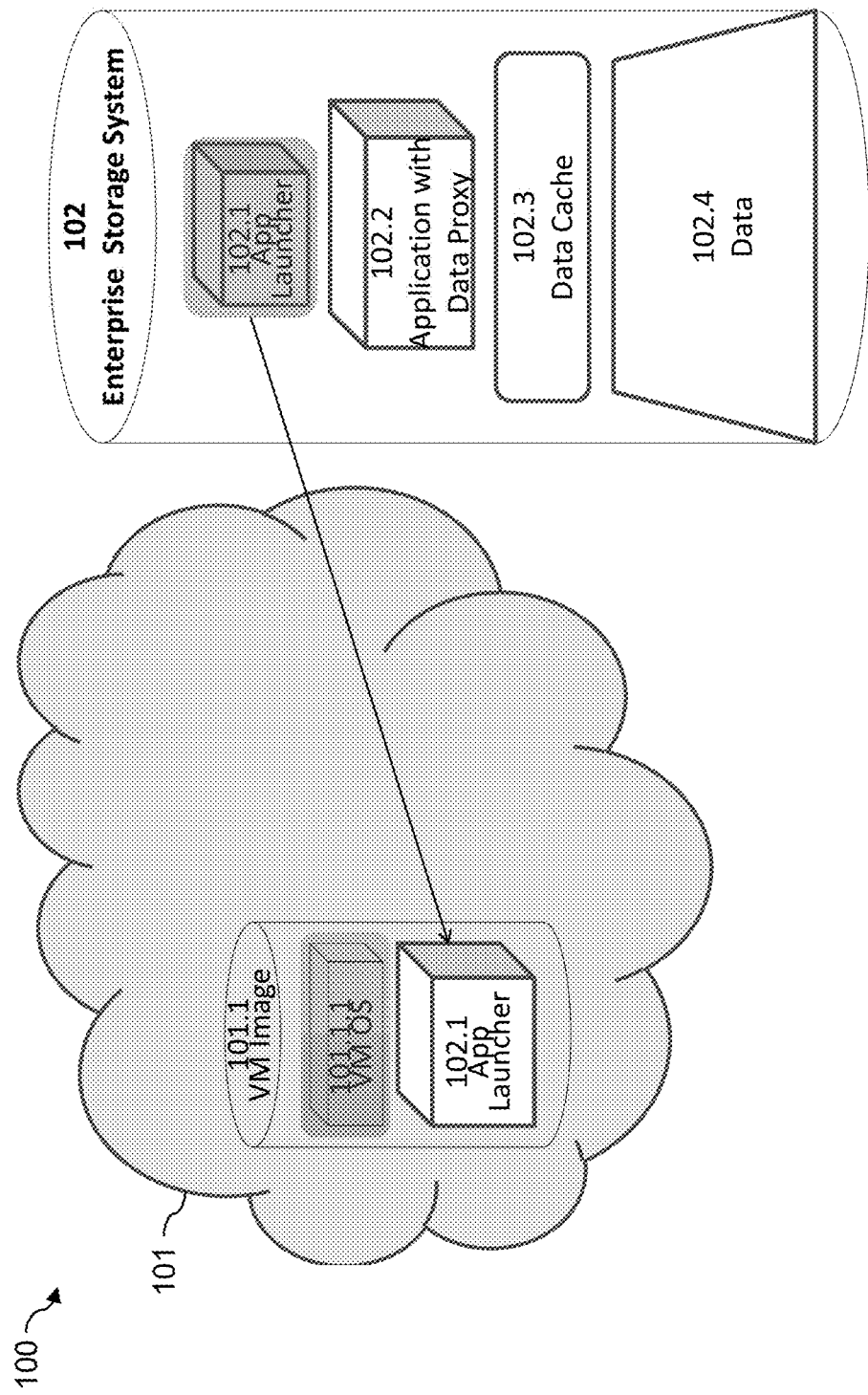
FIGS. 1 through 3 show an information processing system comprising a public cloud and an enterprise storage system and configured to implement secure data access in an illustrative embodiment.

Illustrative embodiments of the present invention will be described herein with reference to exemplary information processing systems and associated host devices, storage devices and other processing devices. It is to be appreciated, however, that embodiments of the invention are not restricted to use with the particular illustrative system and device configurations shown. Accordingly, the term "information processing system" as used herein is intended to be broadly construed, so as to encompass, for example, processing systems comprising cloud computing and storage systems, as well as other types of processing systems comprising various combinations of physical and virtual processing resources. An information processing system may therefore comprise, for example, at least one data center that includes one or more clouds hosting multiple tenants that share cloud resources. Such systems are considered examples of what are more generally referred to herein as cloud computing environments.

We have found that some conventional cloud infrastructure arrangements can exhibit significant drawbacks. For example, an enterprise utilizing a public cloud for application execution may have to copy private data needed by the applications into persistent storage of the public cloud. This can create security concerns for some enterprises relating to the transferred private data.

Some illustrative embodiments provide enhanced security for private data of an enterprise storage system that utilizes cloud infrastructure for application execution. For example, some embodiments provide arrangements in which application execution in a public cloud does not require persistent storage of private data in the public cloud. Such arrangements can advantageously alleviate any security concerns that enterprises might otherwise have if they had to transfer their private data into persistent storage of a public cloud. Enterprises can therefore obtain the numerous benefits associated with cloud computation while also ensuring that their private data remains secure within an enterprise storage system and is never persistently stored within the public cloud.

For example, in one embodiment, an apparatus comprises cloud infrastructure having at least a first cloud. The apparatus further comprises a storage system separate from the first cloud and providing persistent storage for an application and associated data. The first cloud comprises a virtual machine image having installed therein an application launcher for the application of the storage system. Responsive to a request to execute the application in the first cloud, the first cloud configures a virtual machine instance based on the virtual machine image to execute the application launcher. In conjunction with the execution of the application launcher in the virtual machine instance, the application is loaded from the storage system into the virtual machine instance for execution. In conjunction with the execution of the application in the virtual machine instance, a data proxy associated with the application communicates with the storage system to transfer portions of the data required for execution of the application into non-persistent storage of the virtual machine instance.

The application illustratively executes in the virtual machine instance without any of its associated data being stored in persistent storage of the first cloud, thereby alleviating security concerns.

The virtual machine instance can be implemented using a variety of different types of virtualization. For example, it may comprise a container implemented using operating system level virtualization, or a virtual machine implemented using a hypervisor. Other virtualization arrangements are possible.

In some embodiments, the first cloud is one of a plurality of clouds of the cloud infrastructure, and the application launcher is installed in respective virtual machine images of respective ones of the plurality of clouds. The application launcher when executed in respective virtual machine instances that are configured in the respective clouds based on the respective virtual machine images causes at least one application to be loaded into the respective virtual machine instances for execution. The applications in respective ones of the clouds may have corresponding clustered data proxies that can communicate with one another across the plurality of clouds, and a particular one of the clustered data proxies in a particular one of the clouds that includes the storage system can additionally communicate with a data cache of the storage system. One or more clouds may each generate multiple virtual machine instances based on the virtual machine image in which the application launcher is installed. Each of the multiple virtual machine instances in a given one of the clouds may execute a separate application that communicates with the storage system via a separate data proxy.

Some illustrative embodiments can facilitate the use of cloud computing by enterprises by allowing applications to execute in a public cloud while the data utilized by those applications remains securely stored in an enterprise storage system and is not persistently stored in the public cloud. Other illustrative embodiments provide multi-cloud arrangements that allow for efficient federation of private clouds of distinct but related enterprises. Numerous alternative arrangements are possible.

These and other illustrative embodiments described herein include, without limitation, methods, apparatus, systems, and computer program products comprising processor-readable storage media.

Referring initially to FIG. 1, an information processing system 100 comprises a public cloud 101 and an enterprise storage system 102. The public cloud 101 and other clouds referred to herein are illustratively implemented by cloud infrastructure comprising one or more processing platforms. Although the present embodiment includes a public cloud 101, the term "cloud" as used herein is intended to be more broadly construed and may comprise a public cloud, a private cloud, a hybrid cloud or combinations of multiple clouds of different types.

The public cloud 101 in the present embodiment is assumed to comprise a plurality of virtual machine ("VM") images including a VM image 101.1 having an associated VM operating system ("OS") 101.1.1.

The enterprise storage system 102 is assumed to be associated with a business, organization or other entity that is distinct from a cloud provider that implements the public cloud 101. The enterprise storage system 102 is therefore considered separate from the public cloud 101. Other types of separation between the enterprise storage system 102 and the public cloud 101 may be used in other embodiments. The enterprise storage system 102 is further assumed to communicate with the public cloud 101 over at least one communication network which is not explicitly shown in the figure.

The enterprise storage system 102 provides persistent storage for applications and associated data of its corresponding enterprise. More particularly, in this embodiment, the enterprise storage system 102 comprises an application launcher 102.1, an application 102.2, a data cache 102.3 and data 102.4. The application 102.2 in this embodiment is assumed to comprise a data proxy, which will be described in more detail below, although in other embodiments the data proxy may be separate from the application.

Figure 2:
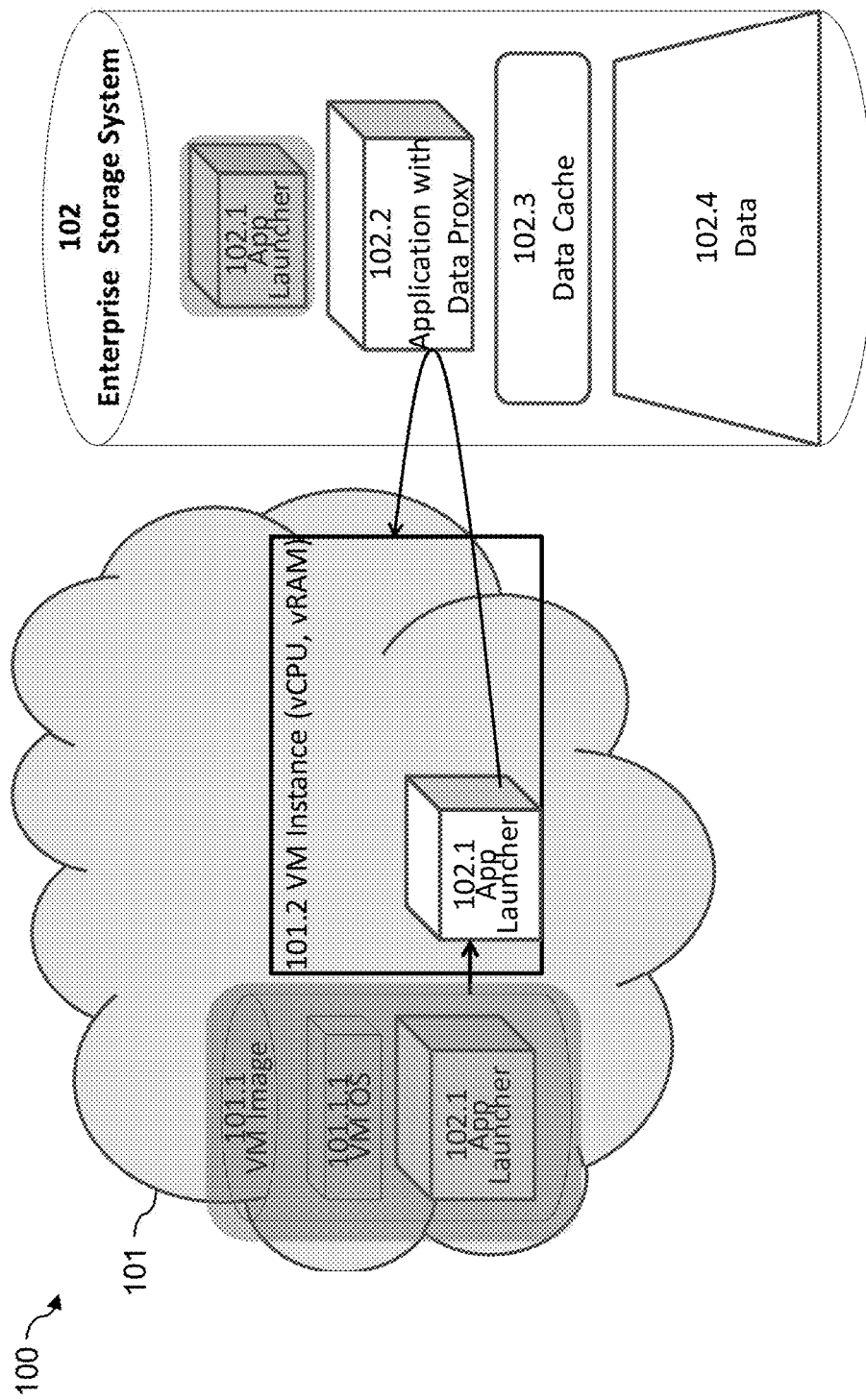
Figure 3:
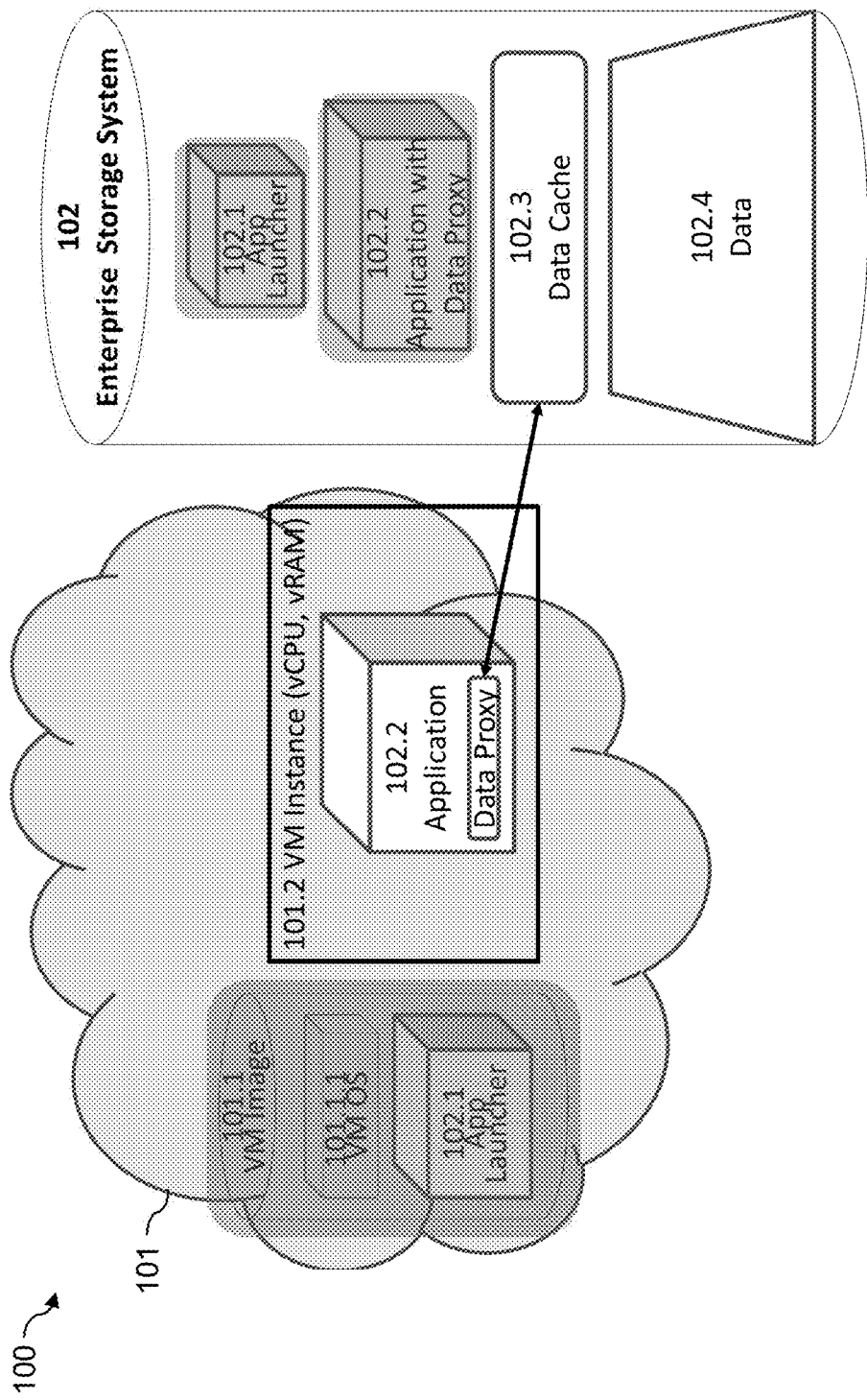

The operation of the information processing system 100 in providing secure access to portions of the data 102.4 of enterprise storage system 102 that are required to allow application 102.2 to execute in the public cloud 101 is illustrated across the sequence of views of FIGS. 1 through 3.

The virtual machine image 101.1 of public cloud 101 as shown in FIG. 1 has the application launcher 102.1 for application 102.2 installed therein. For example, the application launcher 102.1 may be transmitted from the enterprise storage system 102 to the public cloud 101 over a network as part of a procedure to set up the application 102.2 for execution in the public cloud 101. The application launcher 102.1 may more particularly be preinstalled as a pre-boot environment in a separate disk partition added to a virtual disk of the virtual machine image 101.1. Numerous other arrangements can be used for installing the application launcher 102.1 in the virtual machine image 101.1 of the public cloud 101. It is assumed that a copy of the application launcher 102.1 remains in the enterprise storage system 102.

Responsive to a request to execute the application 102.2 in the public cloud 101, the public cloud 101 configures a virtual machine instance 101.2 based on the virtual machine image 101.1 in order to execute the application launcher 102.1. The virtual machine instance 101.2 is shown in FIG. 2 and includes virtual processing resources and virtual volatile memory, illustratively implemented as respective vCPU and vRAM, and may include additional virtual resources such as a virtual disk or virtual network interface.

The request to execute the application illustratively comes from the enterprise storage system 102 at some point after completion of the above-noted procedure for installing the application launcher 102.1 in the virtual machine image 101.1, although other types of requests can trigger the public cloud 101 to initiate execution of the application launcher 102.1 in other embodiments. For example, in other embodiments, the request may be included as part of the same request that initially directs the public cloud to install the application launcher 102.1 in the virtual machine image 101.1. Accordingly, the term "request" as used herein is intended to be broadly construed.

In conjunction with the execution of the application launcher 102.1 in the virtual machine instance 101.2, the application 102.2 is loaded from the storage system into the virtual machine instance 101.2 for execution. It is assumed that a copy of the application 102.2 remains in the enterprise storage system 102.

FIG. 3 shows the application 102.2 and its associated data proxy after the loading of the application 102.2 into the virtual machine instance 101.2. In conjunction with execution of the application 102.2 in the virtual machine instance 101.2, the data proxy associated with the application communicates with the data cache 102.3 of the enterprise storage system 102 to transfer portions of the data required for execution of the application 102.2 into non-persistent storage of the virtual machine instance 101.2. The non-persistent storage of the virtual machine instance 101.2 illustratively comprises the above-noted vRAM of the virtual machine instance 101.2, although other types of non-persistent storage of a virtual machine instance can be used in other embodiments.

The term "non-persistent storage" as used in this context herein illustratively refers to volatile memory or other types of storage resources that are not persisted within the public cloud 101 after the virtual machine instance 101.2 is terminated. This is in contrast to the storage resources of the enterprise storage system 102 that provide persistent storage for the application 102.2 and the data 102.4. Persistent storage as that term is used herein illustratively refers to non-volatile memory such as flash memory or other types of non-volatile storage resources such as disk-based storage resources.

The application 102.2 in the present embodiment therefore executes in the virtual machine instance 101.2 without any of its associated data being stored in persistent storage of the public cloud 101. Instead, the data proxy is illustratively loaded from the enterprise storage system 102 into the virtual machine instance 101.2 as part of the application 102.2. The data proxy is configured to interact with the data cache 102.3 of the enterprise storage system 102 in order to transfer the portions of the data 102.4 required for execution of the application 102.2 within the virtual machine instance 101.2 into the non-persistent storage of the virtual machine instance 101.2 and to transfer corresponding modified data back from the non-persistent storage of the virtual machine instance 101.2 to the enterprise storage system 102.

After execution of the application 102.2 is complete, the virtual machine instance 101.2 may be automatically shut down, with no part of the application 102.2 or its associated data being saved in persistent storage of the public cloud 101.

An arrangement of this type provides enhanced security for the data 102.4 of the enterprise storage system 102 when the corresponding enterprise utilizes the public cloud 101 for application execution. For example, the above-described execution of application 102.2 in virtual machine instance 101.2 does not require persistent storage of the data 102.4 in the public cloud 101. Such arrangements can advantageously alleviate any security concerns that enterprises might otherwise have if they had to transfer their private data into persistent storage of a public cloud. Enterprises can therefore obtain the numerous benefits associated with cloud computation while also ensuring that their private data remains secure within an enterprise storage system and is never persistently stored within the public cloud.

Accordingly, illustrative embodiments can accommodate those enterprises that want to maintain strict control over their applications and data by avoiding any persistent storage thereof in an external cloud. The applications and data can be pulled as needed over a secure connection from enterprise storage into non-persistent memory of a public cloud such as the above-described vRAM of the virtual machine instance 101.2 and other similar virtual machine instances. The applications and data are never stored in persistent storage of the public cloud and the enterprise can retain complete control over the one or more corresponding virtual machine instances by starting or terminating those instances as needed. After a given one of the virtual machine instances is terminated no trace of the application or data utilized in the given instance remains in the public cloud.

As noted above, the public cloud 101 and other clouds referred to herein are illustratively implemented by cloud infrastructure comprising one or more processing platforms. Such cloud infrastructure illustratively implements virtualization techniques for implementing virtual machines such as the virtual machine instance 101.2. The virtualization techniques may include operating system level virtualization techniques such as Linux containers (LXCs). Additionally or alternatively, other types of virtual machines such as those implemented using a hypervisor can be used. The term "virtual machine" as used herein is intended to be broadly construed to encompass, for example, a container implemented using operating system level virtualization, a virtual machine implemented using a hypervisor, or combinations thereof, such as a container configured to run in a hypervisor-based virtual machine.

The enterprise storage system 102 and other storage systems referred to herein are illustratively implemented by one or more storage platforms.

The term "storage platform" as used herein is intended to be broadly construed so as to encompass at least one storage array, at least one storage fabric or a combination of multiple instances of one or more of these and other types of storage devices and systems. For example, a given storage platform can comprise any of a variety of different types of storage including network-attached storage (NAS), storage area networks (SANs), direct-attached storage (DAS), distributed DAS and software-defined storage (SDS), as well as combinations of these and other storage types.

Particular types of storage products that can be used in implementing a given storage platform in an illustrative embodiment include VNX® and Symmetrix VMAX® storage arrays, software-defined storage products such as ScaleIO™ and ViPR®, flash-based storage arrays such as DSSD™, cloud storage products such as Elastic Cloud Storage (ECS), object-based storage products such as Atmos®, scale-out all-flash storage arrays such as XtremIO™, and scale-out NAS clusters comprising Isilon® platform nodes and associated accelerators in the S-Series, X-Series and NL-Series product lines, all from EMC Corporation. Combinations of multiple ones of these and other storage products can also be used in implementing a given storage platform in an illustrative embodiment.

Storage platforms of the type described above may be part of a processing platform that also implements cloud infrastructure. Portions of a given processing platform in some embodiments can comprise converged infrastructure such as VxRail™, VxRack™ or Vblock® converged infrastructure commercially available from VCE, the Virtual Computing Environment Company, an EMC Federation Company. For example, portions of at least one cloud or an associated enterprise storage system of the type disclosed herein can be implemented utilizing converged infrastructure.

Figure 4:
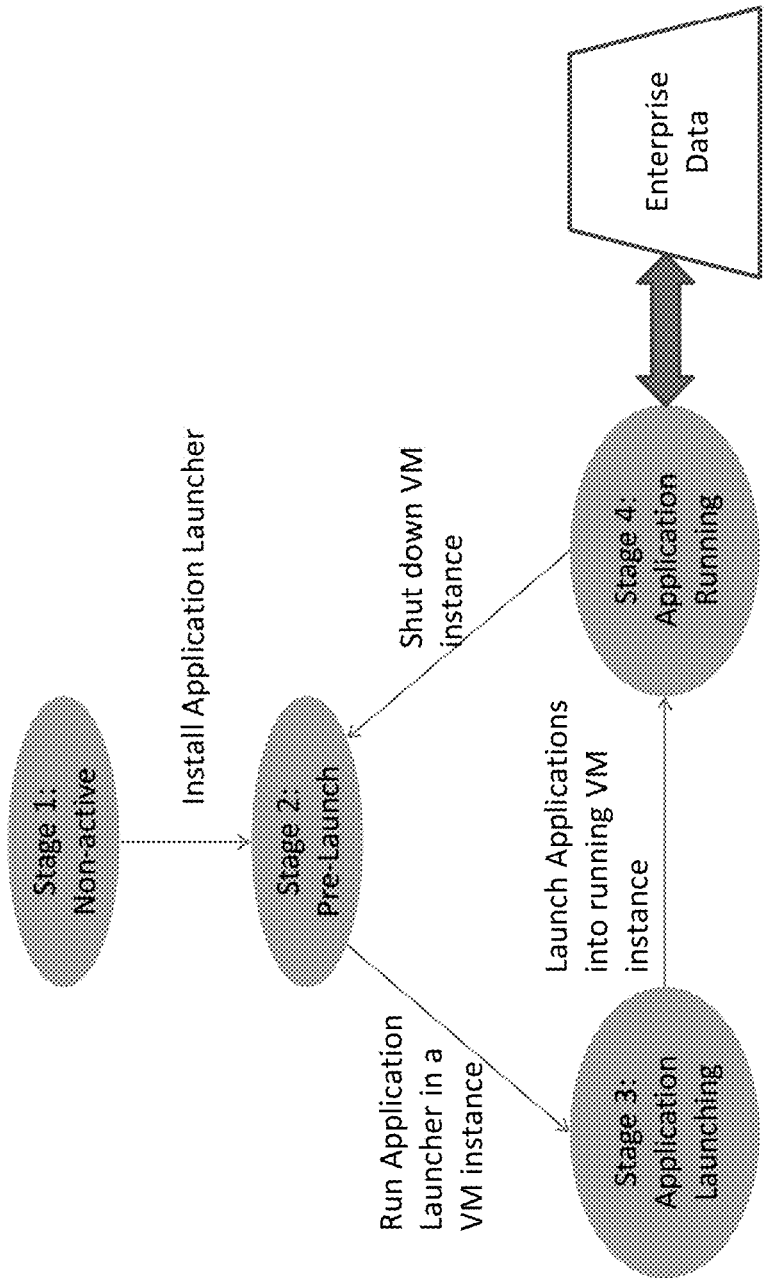
FIG. 4 is an execution stage diagram of an application execution process performed in the information processing system of FIGS. 1 through 3.

FIG. 4 is an execution stage diagram of the application execution process performed in the information processing system of FIGS. 1-3. The process as illustrated includes a plurality of execution stages, denoted Stage 1 through Stage 4.

In Stage 1, the application execution is non-active. Thus, with reference to system 100, the application launcher 102.1 and its corresponding application 102.2 are non-active and located only in the enterprise storage system 102.

From this non-active stage, installation of an application launcher in a virtual machine image of the public cloud moves the process to Stage 2, which is a pre-launch stage. More particularly, in the context of system 100, the application launcher 102.1 is installed in the virtual machine image 101.1. The virtual machine image 101.1 may be a stock virtual machine image suitably modified to incorporate the application launcher 102.1. For example, a stock virtual machine image may be subject to run-time replacement with a custom virtual machine image that includes the application launcher 102.1. As mentioned previously, the application launcher 102.1 may be installed as a pre-boot environment in a separate disk partition that is added to a virtual machine disk.

From the pre-launch stage, the application launcher is run in a virtual machine instance that is based on the virtual machine image, which moves the process to Stage 3, the application launching stage. In the system 100, application launcher 102.1 is running inside virtual machine instance 101.2 of the public cloud 101. The application launcher 102.1 communicates with the enterprise storage system 102 to have application 102.2 loaded into the virtual machine instance 101.2 running in the public cloud 101.

From the application launching stage, the application is launched into a running virtual machine instance, which moves the process to Stage 4, the application running stage. In this stage, the running application securely accesses enterprise data persistently stored in the enterprise storage system. In the system 100, the application 102.2 runs inside the running virtual machine instance 101.2. A data proxy within the application 102.2 communicates with the data cache 102.3 to exchange data with the enterprise storage system 102, illustratively in real time.

From the application running stage, the virtual machine instance is shut down, possibly in conjunction with completion of application execution, thereby returning the process to Stage 2, the pre-launch stage. The application can be executed again by iterating through Stage 2, Stage 3 and Stage 4 as previously described.

The application may be shut down at any time under the control of the enterprise associated with enterprise storage system 102. That enterprise is assumed to be a customer of the cloud provider that makes the public cloud 101 available to its customers for cloud computation. In the system 100, the running virtual machine instance 101.2 is shut down, and when the customer wants to run the application again, it simply repeats the above-described Stages 2, 3 and 4 of the application execution process.

The particular execution stages and other system functionality described in conjunction with the diagram of FIG. 4 are presented by way of illustrative example only, and should not be construed as limiting the scope of the invention in any way. Alternative embodiments can use other types of execution stages and associated processing operations to provide secure data access in cloud computing environments.

For example, although described for the case of a single application having an associated application launcher, other embodiments can include multiple applications each having an associated application launcher, or multiple applications launched by a single application launcher. Accordingly, a given application launcher utilized in the above-described illustrative embodiments can be used to launch multiple applications rather than a single application as described in conjunction with FIGS. 1-4.

Also, the enterprise storage system 102 of the information processing system 100 may itself be associated with a different cloud other than public cloud 101. For example, in some alternative embodiments, the public cloud 101 may instead be a first cloud associated with a first enterprise, and the enterprise storage system 102 may be part of a second cloud associated with a second enterprise that is distinct from but possibly related to the first enterprise.

Secure data access functionality such as that described in conjunction with the execution stage diagram of FIG. 4 can be implemented at least in part in the form of one or more software programs stored in memory and executed by a processor of a processing device such as a computer or server. As will be described below, a memory or other storage device having executable program code of one or more software programs embodied therein is an example of what is more generally referred to herein as a "processor-readable storage medium."

The illustrative embodiments of FIGS. 1-4 advantageously facilitate the use of cloud computing by enterprises by allowing applications to execute in a public cloud while the data utilized by those applications remains securely stored in an enterprise storage system and is not persistently stored in the public cloud.

Other illustrative embodiments provide multi-cloud arrangements, examples of which will now be described with reference to FIGS. 5 through 9.

Figure 5:
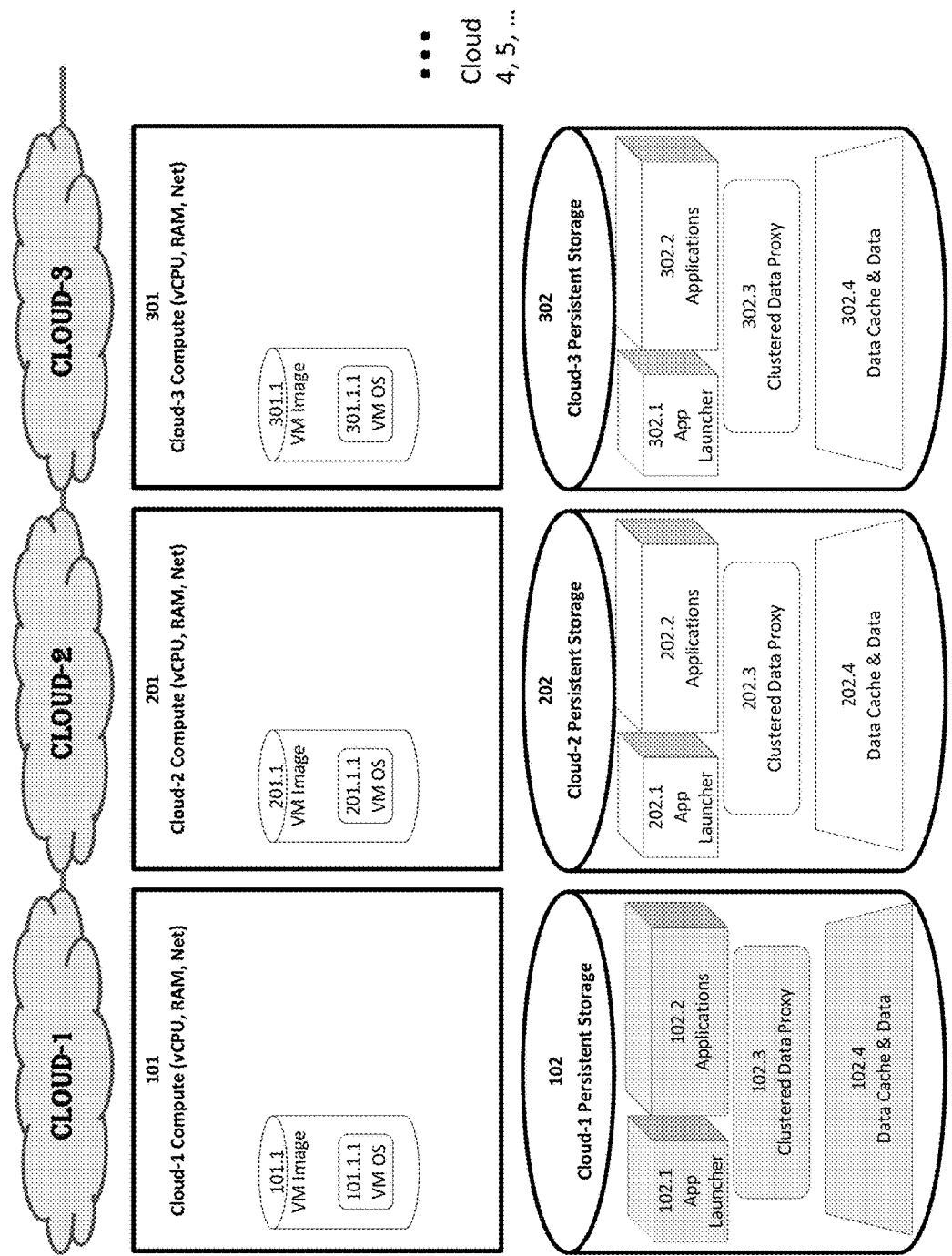
FIGS. 5 through 9 illustrate the operation of an information processing system comprising multiple clouds each having an associated storage system in another embodiment.

Referring initially to FIG. 5, an illustrative multi-cloud embodiment is shown. In this embodiment, an information processing system comprises multiple clouds each having an associated storage system. The clouds explicitly illustrated in the figure are denoted Cloud-1, Cloud-2 and Cloud-3, and the system may include additional clouds denoted Cloud-4, Cloud-5 and so on but not explicitly shown.

It is assumed that each cloud is associated with a different enterprise. For example, the clouds may represent enterprise data centers or other arrangements of cloud infrastructure owned or otherwise controlled by their respective enterprises. The enterprises are assumed to be distinct from one another but may be related in some way. For example, the enterprises may correspond to respective distinct operating divisions of a large corporation. Each cloud includes a cloud compute system and a corresponding storage system.

More particularly, Cloud-1 comprises a compute system 101 that includes a virtual machine ("VM") image 101.1 comprising a virtual machine operating system ("OS") 101.1.1. Similarly, Cloud-2 comprises a compute system 201 that includes a virtual machine image 201.1 comprising a virtual machine operating system 201.1.1, and Cloud-3 comprises a compute system 301 that includes a virtual machine image 301.1 comprising a virtual machine operating system 301.1.1.

Cloud-1 has a storage system 102 comprising an application launcher 102.1, applications 102.2, a clustered data proxy 102.3, and a data cache and data collectively denoted by reference numeral 102.4.

It should be noted that this storage system configuration is similar to but distinct from the configuration of enterprise storage system 102 as previously described in conjunction with the embodiment of FIGS. 1-3. For example, in the present embodiment of FIG. 5, reference numeral 102.2 denotes multiple applications associated with the application launcher 102.1, reference numeral 102.3 denotes a data proxy that is separate from the applications 102.2, and reference numeral 102.4 denotes both the data cache and the data.

Cloud-2 and Cloud-3 each have storage systems configured in substantially the same manner as the storage system of Cloud-1. More particularly, Cloud-2 includes a storage system 202 comprising an application launcher 202.1, applications 202.2, a clustered data proxy 202.3, and a data cache and data collectively denoted by reference numeral 202.4. Similarly, Cloud-3 includes a storage system 302 comprising an application launcher 302.1, applications 302.2, a clustered data proxy 302.3, and a data cache and data collectively denoted by reference numeral 302.4.

Assume that the enterprise controlling Cloud-1 wants to run their applications 102.2 in other clouds including Cloud-2 and Cloud-3. As noted above, these other clouds are assumed to be associated with respective other enterprises that are distinct from but possibly related to the enterprise controlling Cloud-1.

The process for allowing such multi-cloud execution with secure data access follows substantially the same four execution stages previously described in conjunction with the illustrative embodiment of FIG. 4. These stages include the non-active, pre-launch, application launching and application running stages denoted as Stage 1, Stage 2, Stage 3 and Stage 4, respectively. These stages as applied to the present embodiment are illustrated in FIGS. 5, 6, 7 and 8, respectively.

In the non-active stage or Stage 1, illustrated in FIG. 5, all storage system components are assumed to be non-active and located only in persistent storage of the storage system of the corresponding enterprise.

Figure 6:
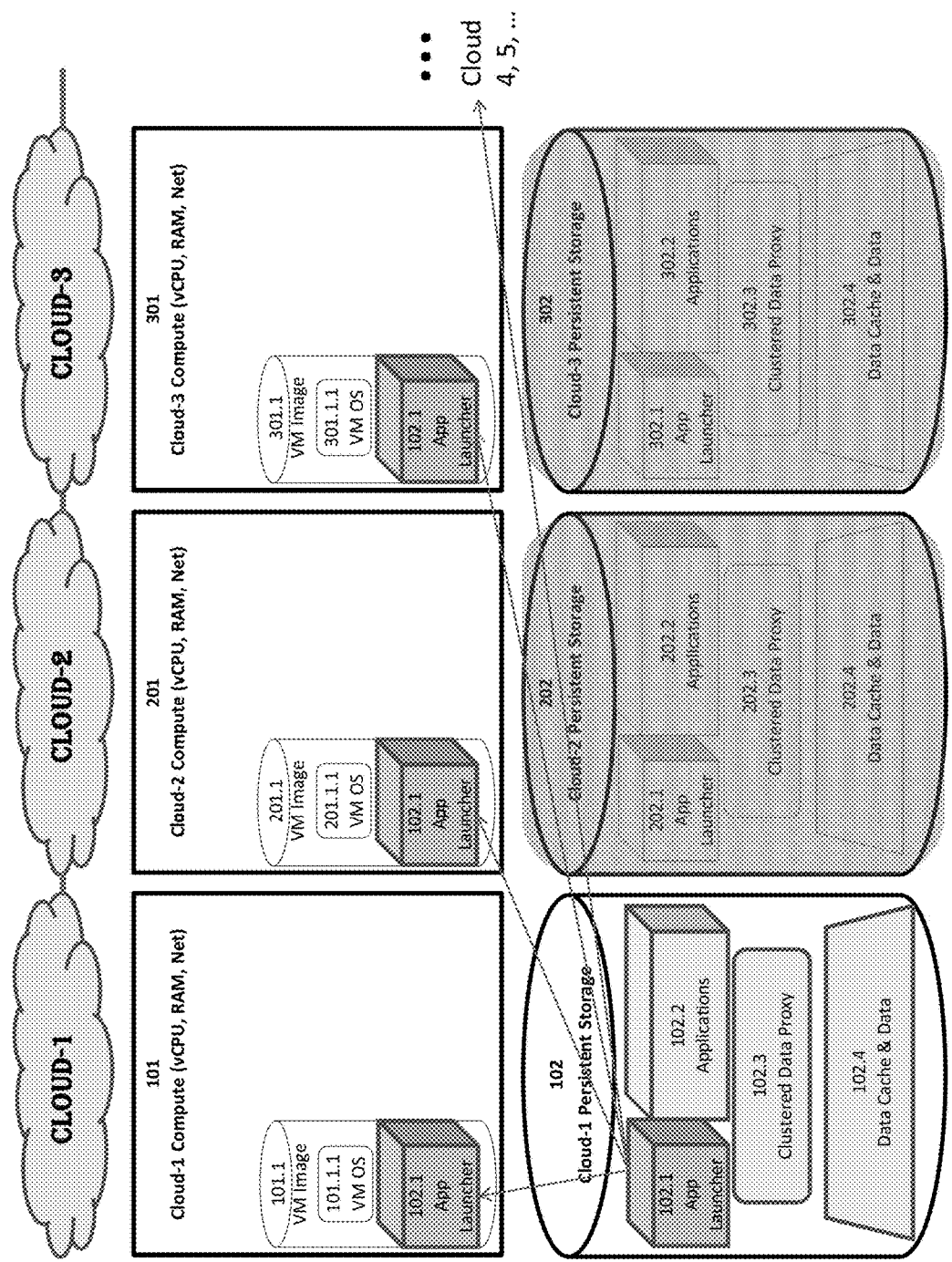

In the pre-launch stage or Stage 2, illustrated in FIG. 6, the application launcher 102.1 is installed in each of the virtual machine images 101.1, 201.1 and 301.1 of the respective clouds Cloud-1, Cloud-2 and Cloud-3. As in other embodiments, the virtual machine images 101.1, 201.1 and 301.1 may represent respective stock virtual machine images that are suitably modified to incorporate the application launcher 102.1.

Figure 7:
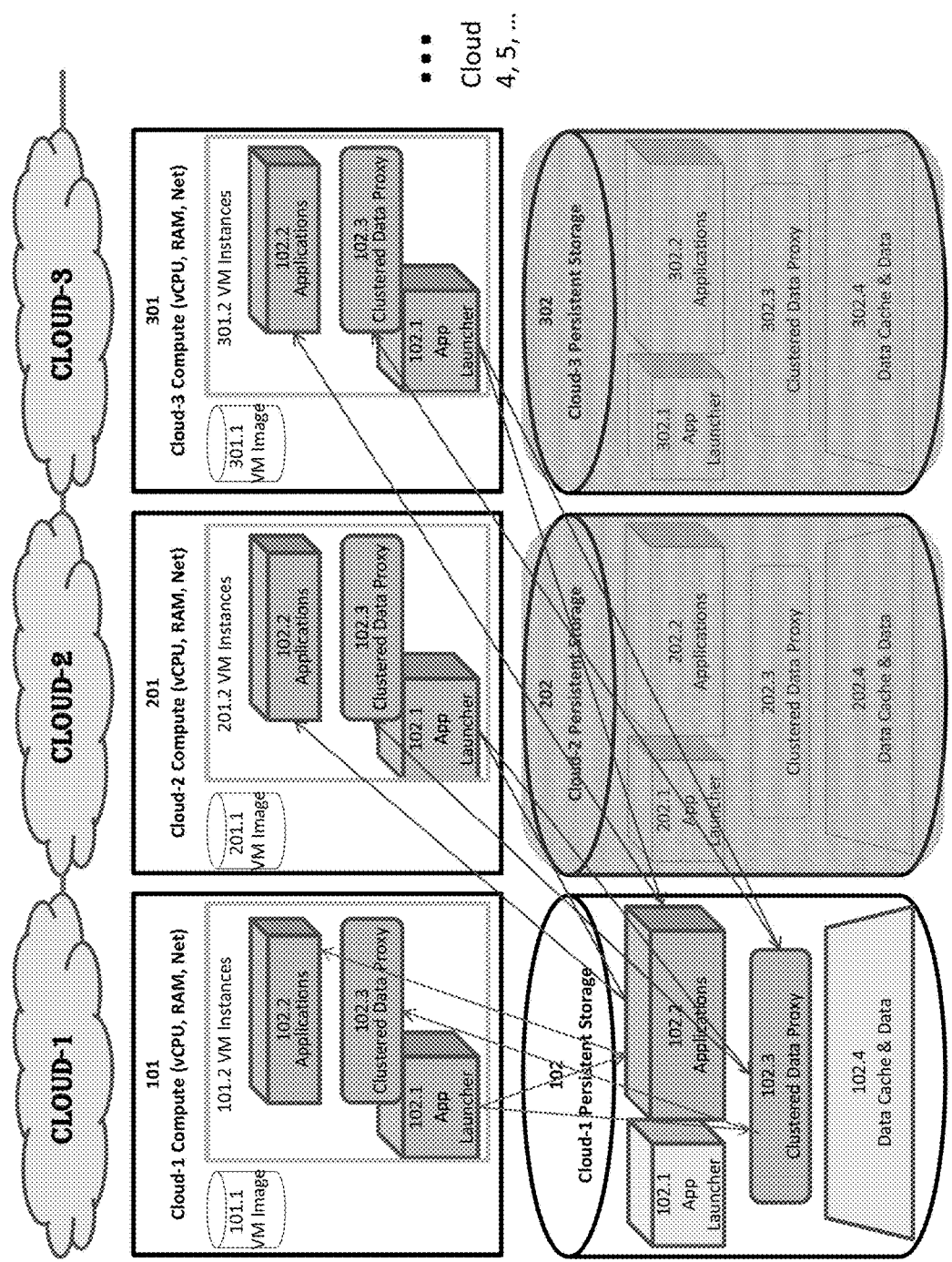

In the application launching stage or Stage 3, illustrated in FIG. 7, virtual machine instances 101.2, 201.2 and 301.2 are generated in the respective compute systems of Cloud-1, Cloud-2 and Cloud-3 based on the respective virtual machine images 101.1, 201.1 and 301.1, and the application launcher 102.1 is running inside each of the virtual machine instances. The application launcher 102.1 communicates with the enterprise storage system 102 to have applications 102.2 and clustered data proxy 102.3 loaded into each of the virtual machine instances 101.2, 201.2 and 301.2 as illustrated. The particular compute resources allocated to the virtual machine instances in each cloud is flexible and may be based at least in part on requests or other information received from the enterprise associated with Cloud-1.

The virtual machine instances may be encrypted or otherwise customized dynamically in real time utilizing information provided by the corresponding application launcher. Applications and other related functionality such as data communication functions can be loaded to virtual machine instances on demand by the associated enterprise.

Figure 8:
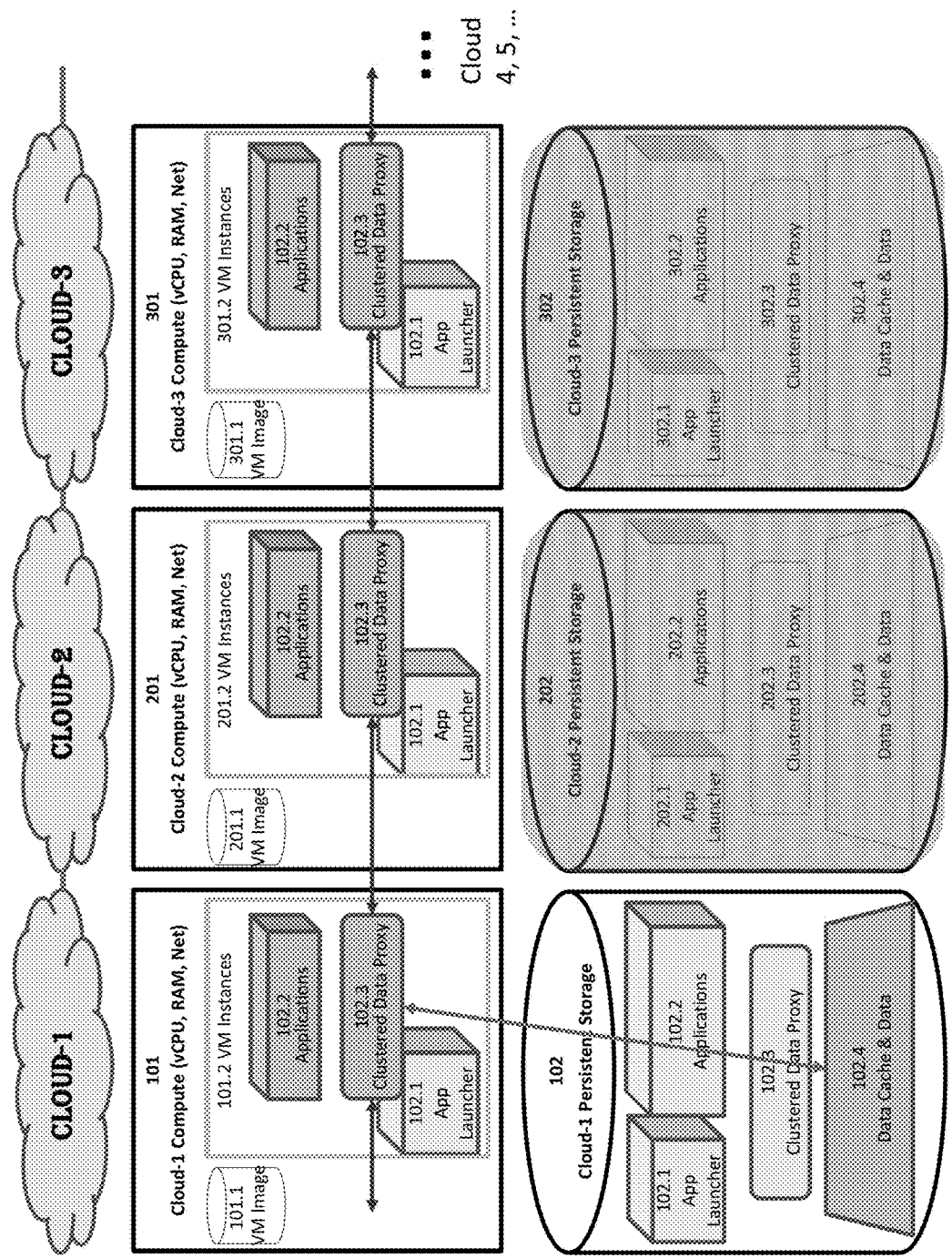

In the application running stage or Stage 4, illustrated in FIG. 8, the applications 102.2 and clustered data proxy 102.3 are running in the virtual machine instances 101.2, 201.2 and 301.2 of the respective clouds. The clustered data proxy 102.3 running in virtual machine instance 101.2 of Cloud-1 communicates with the data cache and data 102.4 as illustrated to access the local data persistently stored in that cloud. It operates in a clustering mode with its peer clustered data proxies running in virtual machine instances 201.2 and 301.2 of respective additional clouds Cloud-2 and Cloud-3 to exchange data in real time as needed for execution of the applications 102.2 in those additional clouds.

The applications can be illustratively configured by default to run in a clustered high availability (HA) mode across multiple clouds without the need for extra dedicated resources. Other operating modes can additionally or alternatively be used. In some implementations, only necessary data are accessed on demand by running applications in remote clouds. For example, data can be processed locally in its own cloud first, with minimum data such as processing results being transferred across multiple clouds.

In the embodiment illustrated in FIGS. 5 through 8, it is assumed that the enterprise associated with Cloud-1 wants to run its applications in the other clouds. However, each of the clouds can similarly run its applications in one or more other clouds. For example, when any one of the enterprises has heavy application execution demand within its own cloud, it can start more virtual machine instances in other clouds in order to take advantage of available compute resources in those clouds, but without undermining the security of its own private data which remains persistently stored only in the storage system of its own cloud.

Accordingly, the private data of one cloud is not written into persistent storage of another cloud in illustrative embodiments. When application execution is complete or otherwise shut down or terminated within the other cloud, no residual portion of the application or its associated data remains within that cloud. Such arrangements avoid the migration of data out of the original storage location within the storage system of a given enterprise to external cloud storage. The entire execution stage process in some embodiments is under the control of the requesting enterprise.

These and other illustrative embodiments therefore advantageously allow application workloads of a given enterprise to be dynamically moved from over-utilized clouds to under-utilized clouds even where the clouds executing the application workloads comprise private clouds of other enterprises.

Figure 9:
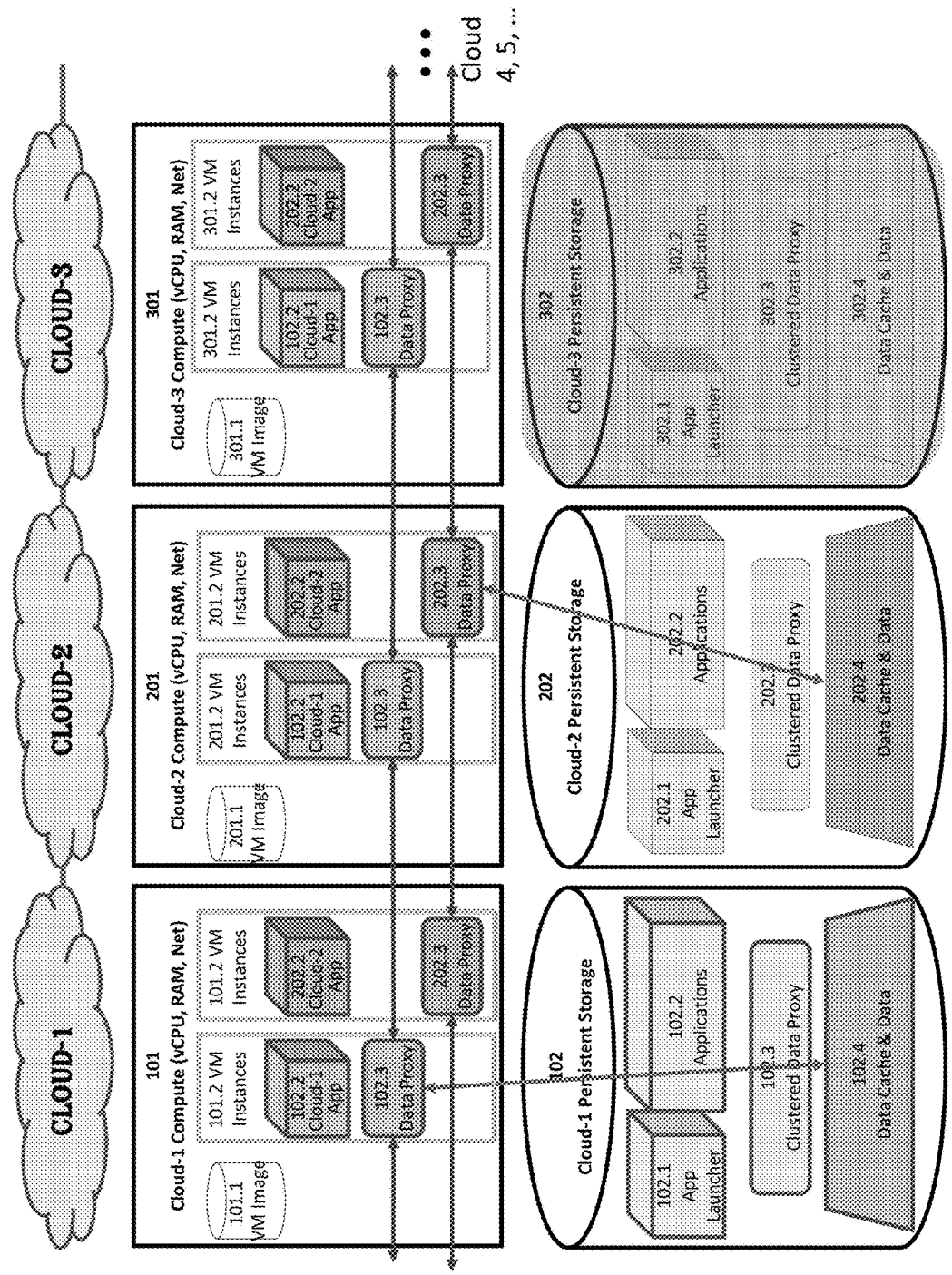

Another illustrative embodiment is illustrated in FIG. 9. In this embodiment, multiple clouds are each configured to run applications from other clouds simultaneously. More particularly, each of Cloud-1, Cloud-2 and Cloud-3 in this embodiment comprises multiple virtual machine instances with each virtual machine instance running applications from a different one of the clouds. For example, in the compute system 101 of Cloud-1, one virtual machine instance 101.2 runs Cloud-1 applications 102.2 using data proxy 102.3 to communicate with the Cloud-1 storage system, and another virtual machine instance 101.2 runs Cloud-2 applications 202.2 using data proxy 202.3 to communicate with the Cloud-2 storage system.

Similarly, in the compute system 201 of Cloud-2, one virtual machine instance 201.2 runs Cloud-1 applications 102.2 using data proxy 102.3 to communicate with the Cloud-1 storage system, and another virtual machine instance 201.2 runs Cloud-2 applications 202.2 using data proxy 202.3 to communicate with the Cloud-2 storage system.

In addition, the compute system 301 of Cloud-3 includes one virtual machine instance 301.2 that runs Cloud-1 applications 102.2 using data proxy 102.3 to communicate with the Cloud-1 storage system, and another virtual machine instance 301.2 that runs Cloud-2 applications 202.2 using data proxy 202.3 to communicate with the Cloud-2 storage system.

In the FIG. 9 embodiment, each of the multiple virtual machine instances in a given one of the clouds executes a separate application or set of applications that communicates with a corresponding storage system via a separate data proxy.

Each of the multiple clouds in a given embodiment may be configured to start applications on demand using the compute resources of other ones of the multiple clouds. Such arrangements illustratively utilize the four-stage execution process described previously, although other execution stages could also be used.

Figure 10:
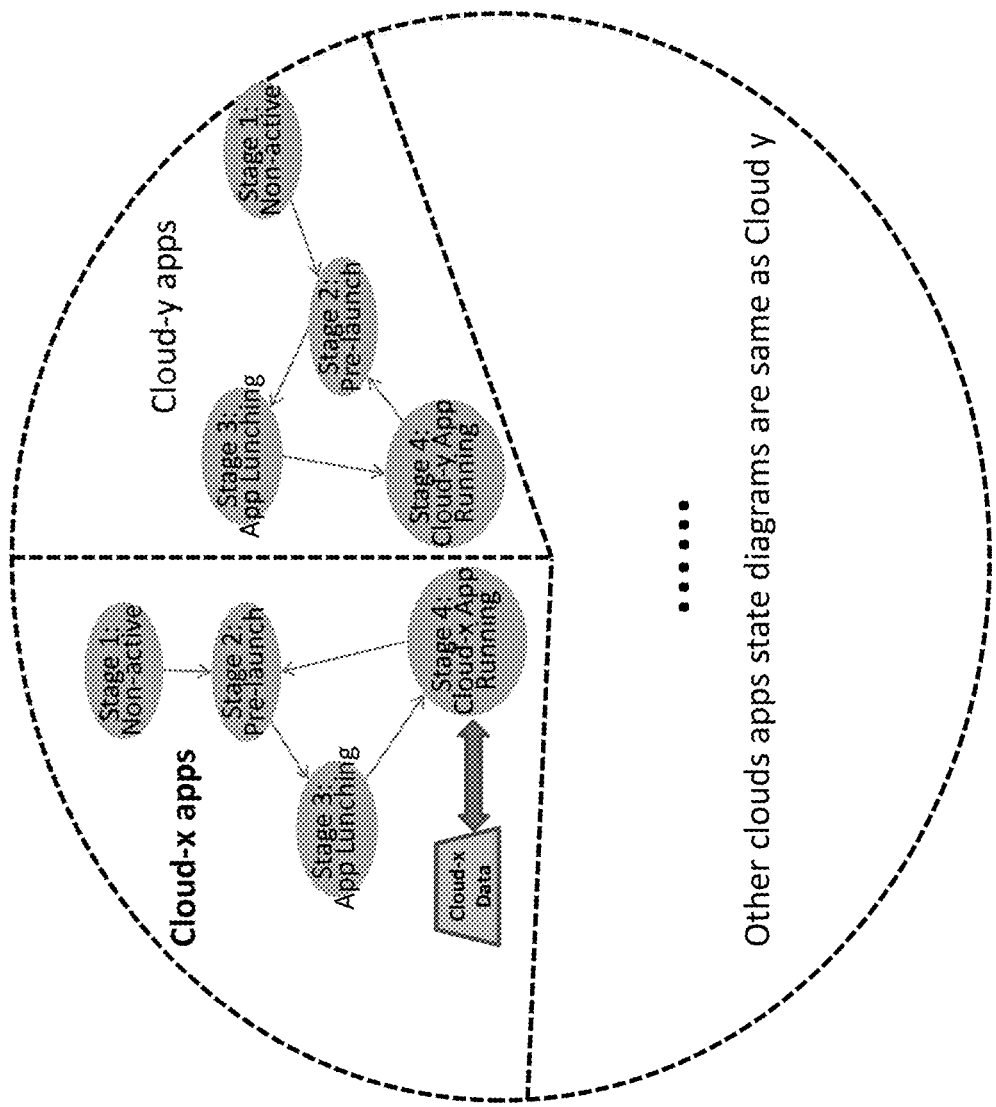
FIG. 10 shows multiple execution stage diagrams each illustrating an application execution process performed in one of the multiple clouds of the information processing system of FIGS. 5 through 9.

FIG. 10 illustrates multiple execution stage diagrams each illustrating an application execution process performed in one of the multiple clouds of an information processing system of the described in FIGS. 5 through 9. Two of the clouds in this embodiment are denoted as Cloud-x and Cloud-y. Each such cloud, including additional clouds not explicitly shown, has a four-stage execution stage diagram of the type shown in FIG. 4. The data of each cloud is persistently stored only within that cloud.

The multiple cloud embodiments described above can be used to federate multiple private clouds. For example, as noted above, private clouds associated with distinct but related enterprises, such as different operating divisions of a large corporation, can be federated using the disclosed techniques so as to allow the private clouds to share compute resources while also maintaining exclusive persistent storage of their respective private data. Similar techniques can be used to federate clouds of a group of similar enterprises, and in numerous other multiple cloud contexts.

Enterprises with sensitive data, such as financial institutions, insurance companies and healthcare companies, can utilize the disclosed techniques to take advantage of external cloud computing resources without requiring that the data be moved to persistent storage of the external cloud. Such enterprises can retain full control of the particular manner in which their applications and data are utilized in the external cloud.

Some embodiments are configured to support a converged infrastructure licensing model in which external compute resources are made available to enterprises for running applications using data that is persistently stored only in the storage systems of the respective enterprises and not in the clouds providing the external compute resources.

It should be noted that the particular arrangements of components in the systems of FIGS. 5 through 9, like those of the system 100 described in conjunction with FIGS. 1 through 3, are presented by way of illustrative example only, and should not be construed as limiting in any way. As noted above, the described functionality can be implemented using additional or alternative components. Accordingly, a wide variety of different secure data access configurations can be used in other embodiments.

For example, in other embodiments, different mappings between running virtual machine instances and the applications and data proxies may be used. For example, a given data proxy in another embodiment could have one or more dedicated virtual machine instances and could communicate with applications through a virtual private network that interconnects the multiple clouds of the system.

The illustrative embodiments described above provide significant advantages over conventional arrangements.

For example, some embodiments achieve effective separation of cloud computation from enterprise storage. This allows compute-only utilization of a public cloud or other type of cloud so as to ensure a high level of security for private data of an enterprise. As a result, a given enterprise can securely run its applications in the cloud utilizing private data that is persistently stored in an enterprise storage system external to the cloud but not persistently stored in the cloud itself.

In these and other embodiments, applications run in the cloud dynamically on demand without the need to be stored persistently in the cloud. A given application is launched using an application launcher that is controlled by the enterprise and is illustratively installed inside a modified stock virtual machine image as a pre-boot environment. Data is dynamically replicated between a launched application and an enterprise storage system when the application is running in the cloud. The data replication process may also be controlled by the enterprise and enabled by applications on demand.

Some embodiments provide efficient techniques for sharing compute resources for execution of applications across multiple clouds while ensuring that the private data of each of the clouds remains persistently stored only in the storage system of that cloud. Applications can therefore run in remote clouds on demand without the need for the applications or the corresponding data to be stored persistently in the remote clouds.

It is to be appreciated that the foregoing advantages are illustrative of advantages provided in certain embodiments, and need not be present in other embodiments.

It should be understood that the particular sets of modules and other components implemented in the information processing systems as described above are presented by way of example only. In other embodiments, only subsets of these components, or additional or alternative sets of components, may be used, and such components may exhibit alternative functionality and configurations. For example, numerous alternative cloud computing environments can be configured to implement secure data access using application launchers, applications and data proxies as disclosed herein.

Functionality such as that described in conjunction with the diagrams of FIGS. 1 through 10 can be implemented at least in part in the form of one or more software programs stored in memory and executed by a processor of a processing device such as a computer or server. A memory or other storage device having executable program code of one or more software programs embodied therein is an example of what is more generally referred to herein as a "processor-readable storage medium."

Communications between the various elements of an information processing system as disclosed herein may take place over one or more networks. These networks can illustratively include, for example, a global computer network such as the Internet, a wide area network (WAN), a local area network (LAN), a satellite network, a telephone or cable network, a cellular network, a wireless network implemented using a wireless protocol such as WiFi or WiMAX, or various portions or combinations of these and other types of communication networks.

The information processing systems disclosed herein are illustratively implemented using one or more processing platforms, examples of which will be now be described in greater detail. A given such processing platform comprises at least one processing device comprising a processor coupled to a memory.

As mentioned previously, portions of an information processing system as disclosed herein illustratively comprise cloud infrastructure. The cloud infrastructure in some embodiments comprises a plurality of containers implemented using container host devices and may additionally or alternatively comprise other types of virtual resources such as virtual machines implemented using a hypervisor. Such cloud infrastructure can therefore be used to provide what is also referred to herein as a cloud computing environment. A given cloud computing environment may but need not accommodate multiple tenants.

The cloud infrastructure mentioned above may represent at least a portion of one processing platform. Another example of such a processing platform is a plurality of processing devices which communicate with one another over a network. The network may comprise any type of network, including, by way of example, a global computer network such as the Internet, a WAN, a LAN, a satellite network, a telephone or cable network, a cellular network, a wireless network such as a WiFi or WiMAX network, or various portions or combinations of these and other types of networks.

Each processing device of the processing platform comprises a processor coupled to a memory. The processor may comprise a microprocessor, a microcontroller, an application-specific integrated circuit (ASIC), a field-programmable gate array (FPGA) or other type of processing circuitry, as well as portions or combinations of such circuitry elements. The memory may comprise random access memory (RAM), read-only memory (ROM) or other types of memory, in any combination. The memory and other memories disclosed herein should be viewed as illustrative examples of what are more generally referred to as "processor-readable storage media" storing executable program code of one or more software programs.

Articles of manufacture comprising such processor-readable storage media are considered embodiments of the present invention. A given such article of manufacture may comprise, for example, a storage array, a storage disk or an integrated circuit containing RAM, ROM or other electronic memory, or any of a wide variety of other types of computer program products. The term "article of manufacture" as used herein should be understood to exclude transitory, propagating signals.

Also included in the processing device is network interface circuitry, which is used to interface the processing device with the network and other system components, and may comprise conventional transceivers.

The particular processing platforms described above are presented by way of example only, and a given information processing system such as system 100 may include additional or alternative processing platforms, as well as numerous distinct processing platforms in any combination, with each such platform comprising one or more computers, servers, storage devices or other processing devices.

Such information processing system components can communicate with other system components over any type of network or other communication media.

It should again be emphasized that the above-described embodiments of the invention are presented for purposes of illustration only. Many variations and other alternative embodiments may be used. For example, the disclosed techniques are applicable to a wide variety of other types and arrangements of information processing systems, cloud computing environments, storage systems, applications, application launchers, data proxies, virtual resources and other elements or components. Also, the particular configurations of system and device elements shown in FIGS. 1-3 and 5-9 and the execution stages in FIGS. 4 and 10 can be varied in other embodiments. Moreover, the various assumptions made above in the course of describing the illustrative embodiments should also be viewed as exemplary rather than as requirements or limitations of the invention. Numerous other alternative embodiments within the scope of the appended claims will be readily apparent to those skilled in the art.

What is claimed is:

1. An apparatus comprising:
cloud infrastructure comprising at least a first cloud; and
a storage system separate from the first cloud and providing persistent storage for one or more applications and associated data;
the first cloud comprising a virtual machine image having installed therein an application launcher for at least one of the applications of the storage system;
wherein responsive to a request to execute the at least one application in the first cloud, the first cloud configures a virtual machine instance based on the virtual machine image to execute the application launcher;
wherein in conjunction with the execution of the application launcher in the virtual machine instance, the at least one application is loaded from the storage system into the virtual machine instance for execution;
wherein in conjunction with the execution of the at least one application in the virtual machine instance, a clustered data proxy associated with the at least one application communicates with the storage system to transfer portions of the data required for execution of the at least one application into non-persistent storage of the virtual machine instance;
wherein the clustered data proxy interacts with a data cache of the storage system to transfer the portions of the data required for execution of the at least one application into the non-persistent storage of the virtual machine instance and to transfer corresponding modified data back from the non-persistent storage of the virtual machine instance to the storage system;
wherein the clustered data proxy and the at least one application run in a same virtual machine instance of the first cloud;
wherein the first cloud is one of a plurality of clouds of the cloud infrastructure; and
wherein the clustered data proxy is configured to communicate with one or more additional clustered data proxies across the plurality of clouds, the one or more additional clustered data proxies corresponding to one or more additional ones of the applications of the storage system running on one or more additional ones of the plurality of clouds;
the cloud infrastructure being implemented on at least one processing platform comprising one or more processing devices each having at least one processor coupled to a memory.

2. The apparatus of claim 1 wherein the storage system comprises an enterprise storage system implemented outside of the cloud infrastructure and the first cloud comprises a public cloud accessible to the enterprise storage system over at least one network.

3. The apparatus of claim 1 wherein the storage system is part of a second cloud of the cloud infrastructure.

4. The apparatus of claim 1 wherein the non-persistent storage of the virtual machine instance comprises virtual random access memory of the virtual machine instance.

5. The apparatus of claim 1 wherein the at least one application executes in the virtual machine instance without any of its associated data being stored in persistent storage of the first cloud.

6. The apparatus of claim 1 wherein the clustered data proxy is loaded from the storage system into the virtual machine instance as part of the at least one application.

7. The apparatus of claim 1 wherein the virtual machine instance is automatically shut down responsive to completion of the execution of the at least one application.

8. The apparatus of claim 1 wherein the application launcher is preinstalled as a pre-boot environment in a separate disk partition added to a virtual disk of the virtual machine image.

9. The apparatus of claim 1 wherein the application launcher is installed in respective virtual machine images of respective ones of the plurality of clouds and wherein the application launcher when executed in respective virtual machine instances that are configured in the respective clouds based on the respective virtual machine images causes at least one of the applications of the storage system and a corresponding data proxy to be loaded into each of the virtual machine instances.

10. The apparatus of claim 9 wherein the first cloud generates multiple virtual machine instances based on the virtual machine image in which application launchers are installed and further wherein each of the multiple virtual machine instances in the first cloud executes one or more applications that communicate with a corresponding storage system via a separate clustered data proxy.

11. The apparatus of claim 9 wherein each of the clouds has a set of clustered data proxies that communicate with respective corresponding clustered data proxies in sets of clustered data proxies in respective other ones of the clouds and wherein a particular one of the clustered data proxies in the set of clustered data proxies in a given one of the clouds is the only one of the clustered data proxies of that set that can access data persistently stored in a local storage system of that cloud.

12. The apparatus of claim 9 wherein the clouds have respective local storage systems and no data of any one of the clouds is persistently stored in a local storage system of any other one of the clouds and wherein one or more applications from a given one of the clouds executing in other ones of the clouds access the corresponding local storage system of the given cloud only via one or more clustered data proxies of that cloud.

13. A method comprising:
providing cloud infrastructure comprising at least a first cloud;
configuring the first cloud for communication with a storage system that is separate from the first cloud and provides persistent storage for one or more applications and associated data;
installing an application launcher in a virtual machine image of the first cloud;
responsive to a request to execute at least one of the applications in the first cloud, configuring in the first cloud a virtual machine instance based on the virtual machine image to execute the application launcher;
in conjunction with the execution of the application launcher in the virtual machine instance, loading the at least one application from the storage system into the virtual machine instance for execution; and
in conjunction with the execution of the application in the virtual machine instance, transferring portions of the data required for execution of the at least one application into non-persistent storage of the virtual machine instance;
wherein a clustered data proxy associated with the at least one application interacts with a data cache of the storage system to transfer the portions of the data required for execution of the at least one application into the non-persistent storage of the virtual machine instance and to transfer corresponding modified data back from the non-persistent storage of the virtual machine instance to the storage system;
wherein the clustered data proxy and the at least one application run in a same virtual machine instance of the first cloud;
wherein the first cloud is one of a plurality of clouds of the cloud infrastructure; and
wherein the clustered data proxy is configured to communicate with one or more additional clustered data proxies across the plurality of clouds, the one or more additional clustered data proxies corresponding to one or more additional ones of the applications of the storage system running on one or more additional ones of the plurality of clouds;
the cloud infrastructure being implemented on at least one processing platform comprising one or more processing devices each having at least one processor coupled to a memory.

14. The method of claim 13 wherein the at least one application executes in the virtual machine instance without any of its associated data being stored in persistent storage of the first cloud.

15. The method of claim 13 wherein the application launcher is installed in respective virtual machine images of respective ones of the plurality of clouds, and further wherein the application launcher when executed in respective virtual machine instances that are configured in the respective clouds based on the respective virtual machine images causes at least one of the applications to be loaded into the respective virtual machine instances for execution.

16. A computer program product comprising a non-transitory processor-readable storage medium having stored therein program code of one or more software programs, wherein the program code when executed by at least one processing device of a processing platform causes the processing platform:
to configure a first cloud of cloud infrastructure for communication with a storage system that is separate from the first cloud and provides persistent storage for one or more applications and associated data;
to install an application launcher in a virtual machine image of the first cloud;
responsive to a request to execute at least one of the applications in the first cloud, to configure in the first cloud a virtual machine instance based on the virtual machine image to execute the application launcher;
in conjunction with the execution of the application launcher in the virtual machine instance, to load the at least one application from the storage system into the virtual machine instance for execution; and
in conjunction with the execution of the at least one application in the virtual machine instance, to transfer portions of the data required for execution of the at least one application into non-persistent storage of the virtual machine instance;
wherein a clustered data proxy associated with the at least one application interacts with a data cache of the storage system to transfer the portions of the data required for execution of the at least one application into the non-persistent storage of the virtual machine instance and to transfer corresponding modified data back from the non-persistent storage of the virtual machine instance to the storage system;
wherein the clustered data proxy and the at least one application run in a same virtual machine instance of the first cloud;
wherein the first cloud is one of a plurality of clouds of the cloud infrastructure; and
wherein the clustered data proxy is configured to communicate with one or more additional clustered data proxies across the plurality of clouds, the one or more additional clustered data proxies corresponding to one or more additional ones of the applications of the storage system running on one or more additional ones of the plurality of clouds.

17. The computer program product of claim 16 wherein the at least one application executes in the virtual machine instance without any of its associated data being stored in persistent storage of the first cloud.

18. The computer program product of claim 16 wherein the application launcher is installed in respective virtual machine images of respective ones of the plurality of clouds, and further wherein the application launcher when executed in respective virtual machine instances that are configured in the respective clouds based on the respective virtual machine images causes at least one of the applications to be loaded into the respective virtual machine instances for execution.

19. The apparatus of claim 1 wherein an additional application launcher is installed in the first cloud for one or more applications of an additional storage system, and wherein responsive to a request to execute at least one of the applications of the additional storage system in the first cloud, the first cloud configures an additional virtual machine instance based on the virtual machine image to execute at least one of the applications of the additional storage system.

20. The computer program product of claim 16 wherein an additional application launcher is installed in the first cloud for one or more applications of an additional storage system, and wherein responsive to a request to execute at least one of the applications of the additional storage system in the first cloud, the first cloud configures an additional virtual machine instance based on the virtual machine image to execute at least one of the applications of the additional storage system.

\* \* \* \* \*